United States Patent
Kim

(10) Patent No.: US 7,854,541 B2
(45) Date of Patent: Dec. 21, 2010

(54) BACKLIGHT UNIT WITH SOCKET CONNECTOR, AND LIQUID CRYSTAL DISPLAY MODULE USING THE SAME

(75) Inventor: Eun-Seok Kim, Gyeonggi (KR)

(73) Assignee: LG Display Co., Ltd., Seoul (KR)

( * ) Notice: Subject to any disclaimer, the term of this patent is extended or adjusted under 35 U.S.C. 154(b) by 172 days.

(21) Appl. No.: 11/644,547

(22) Filed: Dec. 22, 2006

(65) Prior Publication Data

US 2008/0002392 A1   Jan. 3, 2008

(30) Foreign Application Priority Data

Jun. 30, 2006   (KR) .................. 10-2006-0060766

(51) Int. Cl.
*H05K 1/11*   (2006.01)
*H02B 1/056*   (2006.01)

(52) U.S. Cl. ................ 362/646; 362/97.1; 362/221; 362/249.1; 439/56; 439/65; 439/44; 174/59; 174/262

(58) Field of Classification Search ........... 362/646, 362/97, 221, 225, 249; 174/59, 520, 549, 174/262; 439/45, 56, 65, 44
See application file for complete search history.

(56) References Cited

U.S. PATENT DOCUMENTS

| | | | | |
|---|---|---|---|---|
| 2,863,038 A | * | 12/1958 | Lombardo | ................ 174/59 |
| 3,054,024 A | * | 9/1962 | Van Dillen et al. | .......... 455/349 |
| 3,980,875 A | * | 9/1976 | Cote | ............................ 439/56 |
| 4,401,351 A | * | 8/1983 | Record | ........................ 439/65 |
| 4,993,965 A | * | 2/1991 | Eck | .............................. 439/65 |
| 5,017,146 A | * | 5/1991 | Uehara et al. | ................. 439/65 |
| 5,161,998 A | * | 11/1992 | Defibaugh et al. | .......... 439/544 |
| 5,430,615 A | * | 7/1995 | Keeth et al. | ................... 439/65 |
| 5,484,965 A | * | 1/1996 | Woychik | ...................... 439/65 |
| 5,629,839 A | * | 5/1997 | Woychik | ...................... 439/65 |
| 6,565,231 B1 | * | 5/2003 | Cok | ........................... 362/653 |
| 6,733,305 B2 | * | 5/2004 | Pan et al. | ...................... 439/74 |
| 6,739,733 B1 | * | 5/2004 | Lamke et al. | ................ 362/646 |
| 6,781,845 B2 | * | 8/2004 | Chang | ......................... 439/65 |
| 2003/0236006 A1 | * | 12/2003 | Yamashita | .................... 439/65 |
| 2005/0181637 A1 | * | 8/2005 | Williams et al. | .............. 439/65 |
| 2006/0128174 A1 | * | 6/2006 | Jang et al. | ...................... 439/65 |

FOREIGN PATENT DOCUMENTS

JP   08-292436   11/1996

OTHER PUBLICATIONS

Office Action issued in corresponding Chinese Patent Application No. 2006-10169492.2; issued Jul. 11, 2008.

* cited by examiner

*Primary Examiner*—Ismael Negron
(74) *Attorney, Agent, or Firm*—Brinks Hofer Gilson & Lione

(57) ABSTRACT

A backlight unit with socket connecter includes: a bottom frame having a topside and a backside; at least one lamp on the topside of the bottom frame; a socket connector disposed on a backside of the bottom frame, the socket connector being connected to the lamp; and a backlight circuit board having a plug connector connected to the socket connector.

14 Claims, 6 Drawing Sheets

BACKLIGHT UNIT WITH SOCKET CONNECTOR, AND LIQUID CRYSTAL DISPLAY MODULE USING THE SAME

This patent document claims the benefit of Korean Patent Application No. 10-2006-0060766, filed in Korea on Jun. 30, 2006, which is hereby incorporated by reference in its entirety.

BACKGROUND

1. Field

The present invention relates to a backlight unit and a backlight driving circuit board, and a liquid crystal display (LCD) module using the backlight unit.

2. Related Art

Flat panel display (FPD) devices have a relatively light weight, thin profile, and low power consumption. FPD devices are commonly used as a substitute for cathode ray tube (CRT) devices. Generally, display devices may be classified according to self-emission. For example, display devices may be classified as emissive display devices or non-emissive display devices. Emissive display devices display images by self-emitting light. Non-emissive display devices require a light source since they do not emit light by themselves. For example, plasma display panel (PDP) devices, field emission display (FED) devices, and electroluminescent display (ELD) devices are commonly used emissive display devices. Liquid crystal display (LCD) devices may be categorized as non-emissive display devices. However, some applications of LCD devices do not require a light source. LCD devices are commonly used in notebook and desktop computers because of their high resolution, color display capability, and high quality image.

LCD devices include an LCD module. The LCD module includes an LCD panel that displays images to an exterior and a backlight unit that supplies light to the LCD panel. The LCD panel includes two substrates that face each other and are spaced apart from each other. A liquid crystal material is interposed therebetween. Liquid crystal molecules of the liquid crystal material have a dielectric constant and refractive index anisotropic characteristics due to their long thin shape. Two electric field generating electrodes are formed on the two substrates, respectively. An orientation alignment of the liquid crystal molecules may be controlled by supplying a voltage to the two electrodes such that transmittance of the LCD panel is changed according to polarization properties of the liquid crystal material.

Generally, an additional light source is required because the LCD panel is a non-emissive-type display device. Accordingly, a backlight unit is disposed under the LCD panel. The LCD device displays images using light produced by the backlight unit and supplied to the LCD panel. Backlight units may be classified into a side-type backlight unit and a direct-type backlight unit in accordance with a disposition of the light source. The direct-type backlight unit has one lamp or a couple of lamps disposed at a side portion of a light guide plate. Alternatively, at least one lamp is disposed at each side portion of the light guide plate, respectively.

The side-type backlight unit has a plurality of lamps disposed under the light guide plate. In a large sized LCD module, the direct-type backlight unit may provide the LCD module with a uniform light source although the side-type backlight unit is more easily manufactured than the direct-type.

FIG. 1 is a schematic perspective view showing a direct-type backlight unit according to the related art. As shown in FIG. 1, a direct-type backlight unit includes a bottom frame 50, a reflective sheet 22 on the bottom frame 50, and a plurality of fluorescent lamps 24 on the reflective sheet 22. Both sides of the bottom frame 50 are bent toward an inner portion thereof. Although not shown, the reflective sheet 22 has a plurality of holes corresponding to the plurality of fluorescent lamps 24, so the light from the fluorescent lamp 24 is substantially exposed through the hole. For example, the reflective sheet 22 covers an inner surface of the bottom frame 50 except for the area where the fluorescent lamps 24 are disposed. Although not shown, a diffusion plate and an optical sheet group may be disposed on the fluorescent lamp.

As shown in FIG. 1, the fluorescent lamps are arranged parallel to each other and are driven by a high-low type that has a ground portion formed at respective end portions of the fluorescent lamps 24. Light from the fluorescent lamp 24 is emitted by applying an alternating current voltage waveform through a wire 36 that extends from an electrode (not show) in the fluorescent lamp 24.

As shown in FIG. 1, the fluorescent lamp 24 includes at least two fluorescent lamps. The couple of fluorescent lamps are fixed on the bottom frame 50 with a lamp holder 32 connected with the wire 35 that is connected to an external power supply. The wire 36 extends from a backside of the bottom frame 50 and is connected to a socket connector 38a at an end portion of the wire 36.

An inverter 40 that converts a direct current voltage into an alternating current voltage is necessary because the alternating current voltage is required to drive the fluorescent lamp 24. A backlight driving circuit board 34, which includes a driving circuit (not shown) of the fluorescent lamp 24 and the inverter 40, is mounted on the backside of the bottom frame 50. The backlight driving circuit 34 further includes a plug connector 38b that connects the socket connector 38a and the backlight driving circuit 34. A power supply is applied to the fluorescent lamp 24 through connecting the socket connector 38a and the plug connector 38b.

The wire 36 is exposed at the backside of the bottom frame 50, as shown in FIG. 2, for example, when the backlight driving circuit board 34 is mounted on the backside of the bottom frame 50 and when the socket connector 38a, which is connected to the end portion of the wire 36 that extends from the fluorescent lamp 24, is connected to the plug connector 38b on the backlight driving circuit board 34.

Accordingly, the exposed wires 36 may contact each other, which would create a short or interference between the wires 36 and leakage of the voltage may occur by the alternating current voltage applied to the respective wires 36. Consequently, there is a problem that the emission of the fluorescent lamp 24 is not uniform.

SUMMARY

The present embodiments may obviate one or more of the limitations or disadvantages of the related art. For example, in one embodiment, a backlight unit prevents interference between wires and leakage of the voltage. In another exemplary embodiment, a backlight unit includes fluorescent lamps capable of uniformly emitting light.

In one embodiment, a backlight unit includes a bottom frame that has a topside and a backside. At least one fluorescent lamp is disposed on a topside of the bottom frame. A socket connector is disposed on the backside of the bottom frame. The socket connector is connected to the fluorescent lamp. A backlight circuit board that has a plug connector is connected to the socket connector.

In one embodiment, a liquid crystal display module includes a backlight unit that has a topside and a backside and a bottom frame. At least one fluorescent lamp is disposed on a topside of the bottom frame. A socket connector is disposed on a backside of the bottom frame. The socket connector is connected to the fluorescent lamp. A backlight circuit board that has a plug connector is connected to the socket connector. A liquid crystal panel is disposed over the backlight unit. A main frame surrounds the liquid crystal panel and the backlight unit. A top frame surrounds a front edge of the liquid crystal panel.

In one embodiment, a method of connecting a backlight to a circuit board includes providing a through hole through a bottom frame, inserting a socket connector into the through hole, providing a plug connector on a backlight driving circuit board, and inserting the socket connector into the plug connector.

It is to be understood that both the foregoing general description and the following detailed description are exemplary and explanatory and are intended to provide further explanation of the claimed subject matter, but is not intended to limit it.

DETAILED DESCRIPTION

Figure 1:
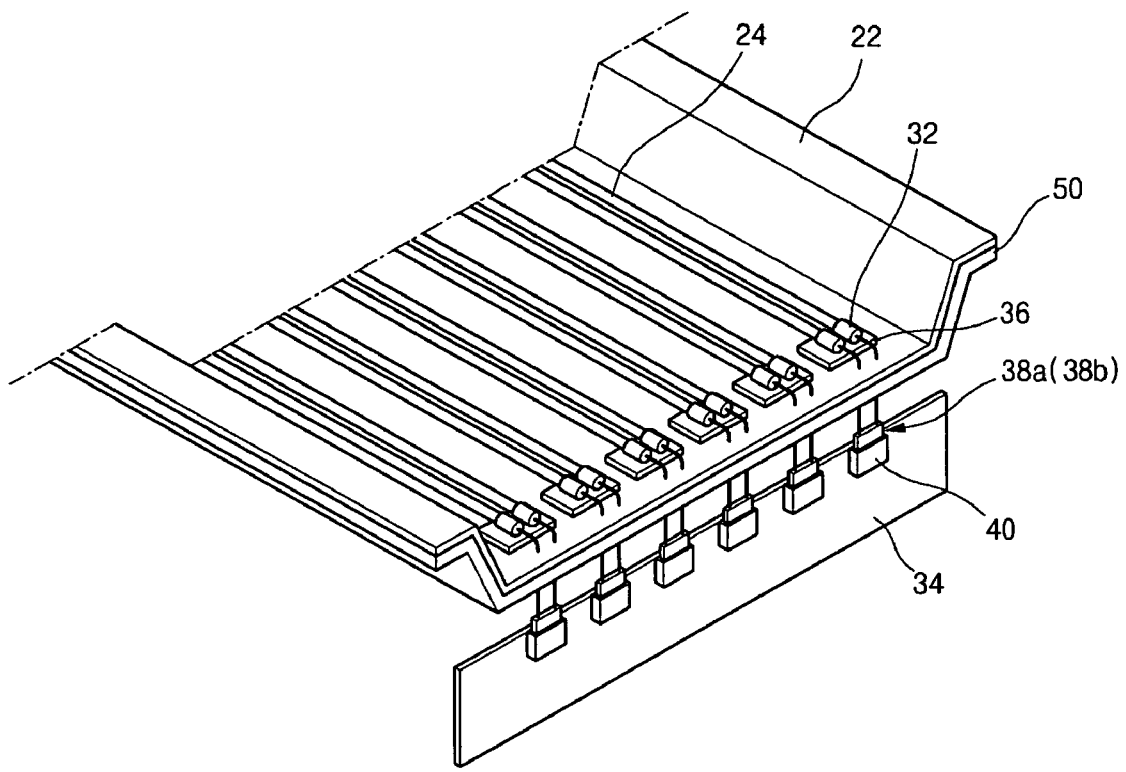
FIG. 1 is a perspective view showing a direct-type backlight unit according to the related art.
Figure 2:
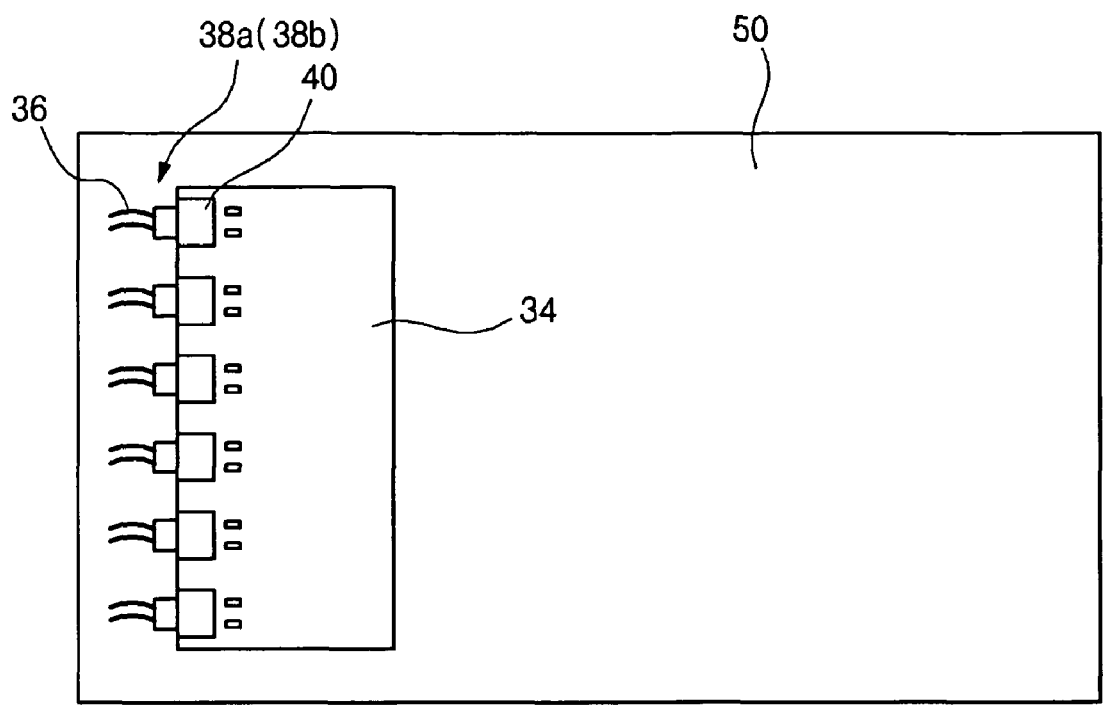
FIG. 2 is a schematic plan view showing a backside of a backlight unit of FIG. 1.
Figure 3:
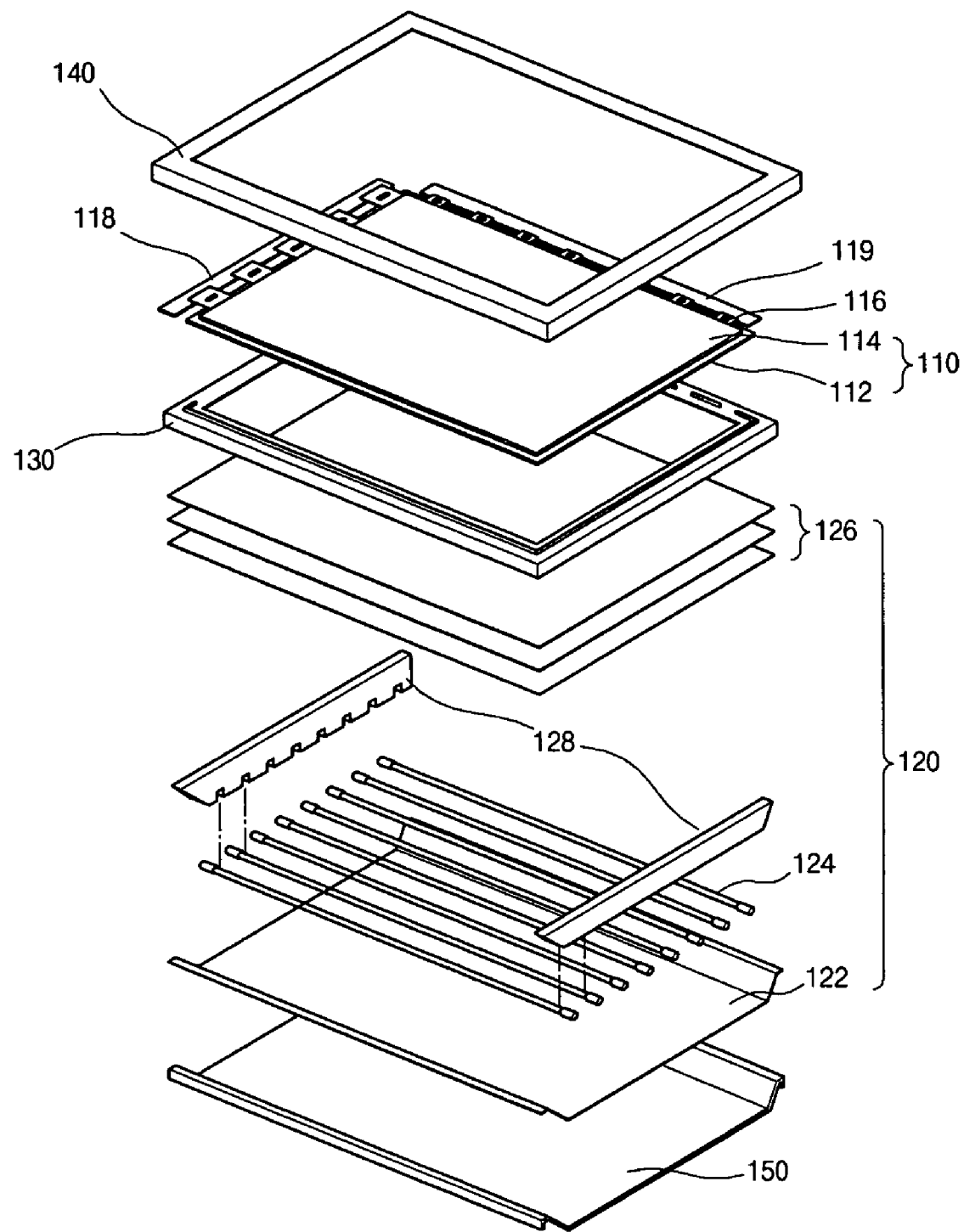
FIG. 3 is a perspective view showing one embodiment of an LCD module.
Figure 4A:
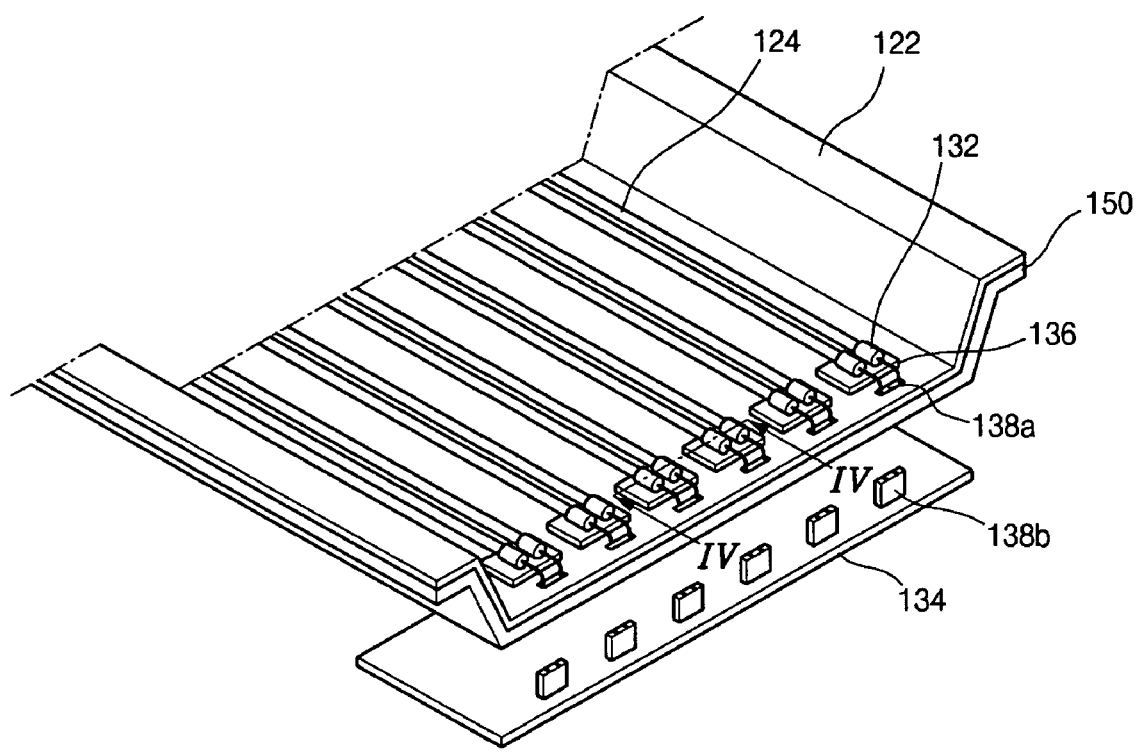
FIG. 4A is a perspective view of one embodiment of a backlight unit for an LCD module.
Figure 4B:
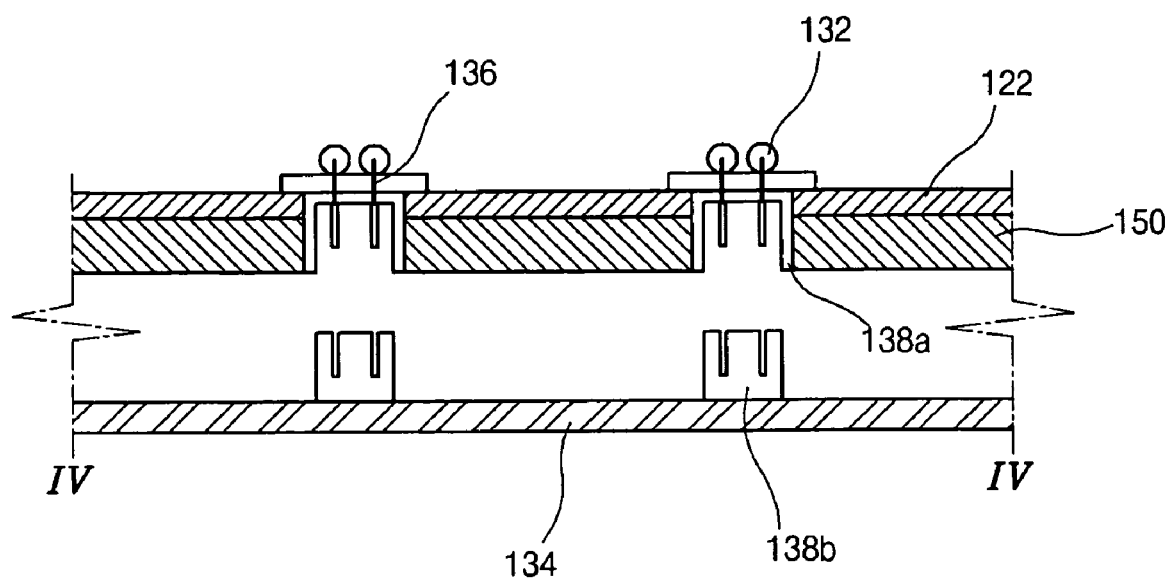
FIG. 4B is a cross-sectional view of one embodiment of a backlight unit for an LCD module.

In one embodiment, as shown in FIGS. 3, 4A and 4B, an LCD module includes a LCD panel 110, a backlight unit 120, a main frame 130, a bottom frame 150 and a top frame 140. The backlight unit includes a reflective sheet 122. A plurality of fluorescent lamps 124 are disposed on the reflective sheet 122 and arranged to be parallel to each other. An optical sheet group 126 is disposed on the fluorescent lamps 124. Each of the fluorescent lamps 124 is fixed by a plurality of side supports 128 on the bottom frame 150. However, the present embodiments are not limited to a plurality of side supports 128. For example, one side support may be used to fix one fluorescent lamp or a plurality of fluorescent lamps.

In one embodiment, an LCD panel 110 is disposed over the backlight unit 120. The backlight unit 120 and the LCD panel 110 are fixed as a set by the bottom frame 150 that surrounds the backlight unit 120 and the top frame 140 combined with the bottom frame 150. In this embodiment, the backlight unit 120 includes a backlight driving circuit board 134 that includes a driving circuit.

In one embodiment, a gate printed circuit board 118 and a source printed circuit board 119 are disposed along edges of the LCD panel 110 using a flexible circuit board 116. The gate printed circuit board 118 and the source printed circuit board 119 are bent and adhered toward or to a side or a backside of the bottom frame 150 during a modulation process of the backlight unit 120. The gate printed circuit board 118 applies an ON/OFF signal of a thin film transistor (not shown) through a plurality of gate lines (not shown), and the source printed circuit board 119 applies an image signal by one frame through a plurality of data lines (not shown). For example, the gate printed circuit board 118 and the source printed circuit board 119 are disposed adjacent to each other.

In one embodiment, the backlight unit 120 includes the backlight driving circuit board 134 on which the driving circuit that controls the plurality of fluorescent lamps 124 is mounted. As shown in FIG. 4A, the socket connector 138a is inserted into a through hole (not shown) of the bottom frame 150 to connect the fluorescent lamp 124 and the wire 136. The wire 136 is connected to the socket connector 138a and connected to an external power supply of the fluorescent lamp 124. The plug connector 138b on the backlight driving circuit board 134 that is mounted on the backside of the bottom frame 150 is connected to the socket connector 138a.

As shown in FIG. 4A, the reflective sheet 122 is disposed on the bottom frame 150, and the plurality of fluorescent lamp 124 are disposed on the reflective sheet 122 and are arranged to be parallel to each other. For example, both edge portions of the bottom frame 150 are bent along a top direction toward the LCD panel (not shown), and the fluorescent lamps 124 are disposed on the reflective sheet 122. The reflective sheet 122 has a plurality of holes (not shown) corresponding to the fluorescent lamps 124, so the fluorescent lamps 124 are exposed through the holes. The reflective sheet 122 is disposed on the inner surface of the bottom frame 150 except the fluorescent lamps 124.

In one embodiment, the fluorescent lamp 124 includes a glass tube (not shown), a discharge gas in the glass tube, and a fluorescent substance (not shown) on an inner surface of the glass tube. Electrodes (not shown) may be formed at both end portions of the glass tube. In one embodiment, the fluorescent lamp 124 includes at least a couple of fluorescent lamps 124 and is fixed on the bottom frame 150 through the lamp holder 132 connected to the wire 136 that is connected to the external power supply. The fluorescent lamp 124 is connected to the wire 136 at the end portion thereof. A through hole (not shown) is formed in the bottom frame 150 so that the socket connector 138a is inserted into the through hole of the bottom frame 150. The socket connector 138a, which is connected to the end portion of the wire 136, is exposed in the backside of the bottom frame 150 and is fixed from the bottom frame 150.

In one embodiment, the fluorescent lamp 124 is a high-low type that has a ground portion formed at the end portion of the fluorescent lamp 124. An inverter that changes the direct current voltage into an alternating current voltage because the alternating current voltage is necessary for driving the highlow type fluorescent lamp 124. For example, the alternating current voltage is a high voltage. The backlight driving circuit board 134 on which the driving circuit and the inverter are mounted is disposed on the backside of the bottom frame 150.

A plurality of plug connectors 138b are projected toward the socket connector 138a and disposed on the backlight driving circuit board 134.

In one embodiment, as shown in FIG. 4B, the socket connector 138a is inserted into the through hole of the bottom frame 150 and is fixed to the bottom frame 150. The socket connector 138a is exposed from the backside of the bottom frame 150, and the plug connector 138b is disposed on the backlight driving circuit board 134 toward the socket connector 138a. The socket connector 138a is inserted into the plug connector 138b, so the fluorescent lamp 124 and the backlight driving circuit board 134 are electrically connected to each other. The power supply of the alternating current voltage applies to the electrodes and the fluorescent lamp 124 is emitted by connecting the socket connector 138a and the plug connector 138b. For example, the alternating current voltage is a high voltage.

Figure 5:
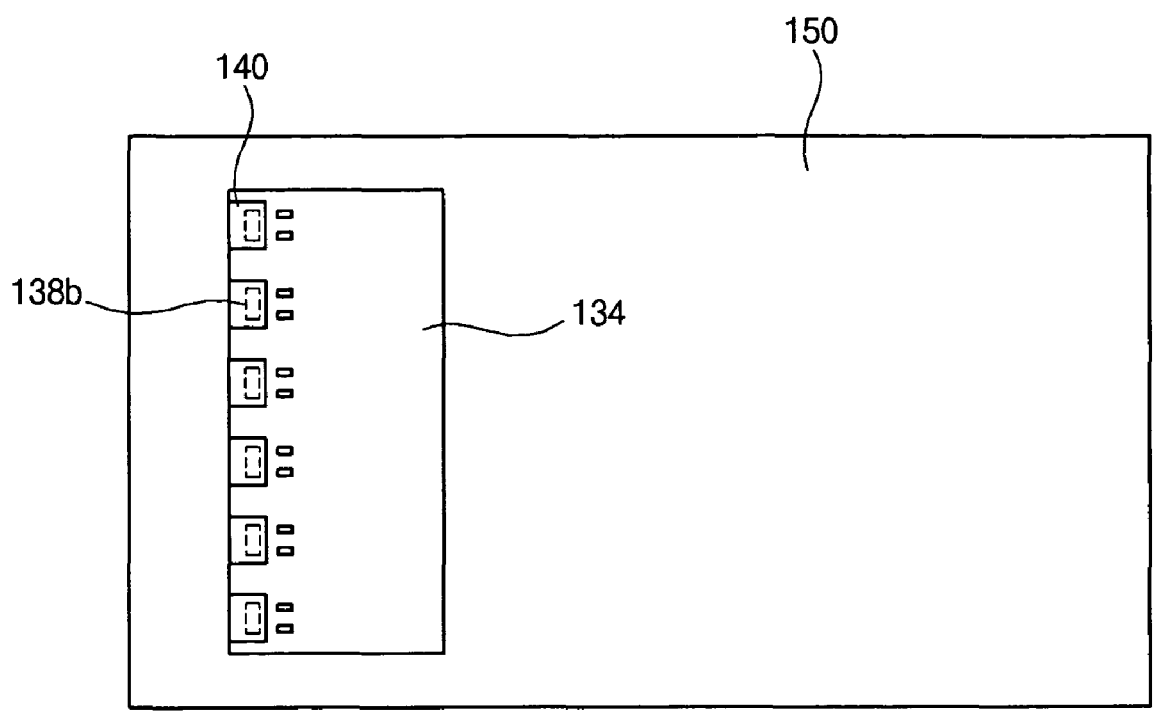
FIG. 5 is a schematic plan view of one embodiment of a backside structure of a backlight unit.

FIG. 5 is a schematic plan view of a backside structure of a backlight unit of FIG. 4. In FIG. 5, the fluorescent lamp 124 and the backlight driving circuit board 134 are electrically connected to each other by connecting the socket connector 138a and the plug connector 138b in order to prevent exposure of the wire 136 (FIG. 4A).

For example, the wires 136 according to the related art extend from the backside of the bottom frame with an exposed state and create interference of the wires and leakage of the voltage.

In one embodiment, the socket connector, which is inserted into the bottom frame and exposed from the backside of the bottom frame, is combined with the plug connector on the backlight driving circuit board in order to connect the fluorescent lamp and the backlight driving circuit board. As explained above, since the fluorescent lamp and the backlight driving circuit board are electrically connected using the socket connector and the plug connector, interference between wires or the leakage of the voltage can be prevented. Consequently, the fluorescent lamp can be uniformly emitted.

It will be apparent to those skilled in the art that various modifications and variations can be made in a liquid crystal display device of the present invention without departing from the spirit or scope of the invention. Thus, it is intended that the present invention cover the modifications and variations of this invention provided they come within the scope of the appended claims and their equivalents.

The invention claimed is:

1. A backlight unit, comprising:
a bottom frame having a topside and a backside;
at least one lamp on the topside of the bottom frame;
a socket connector disposed on a backside of the bottom frame, the socket connector being connected to the lamp, wherein the bottom frame has a hole that corresponds the socket connector, the socket connector being inserted into the hole of the bottom frame;
a backlight circuit board having a plug connector connected to the socket connector, wherein the plug connector connected to the socket connector is disposed in the hole of the bottom frame; and
a wire for connecting the socket connector to the lamp, wherein the wire is not exposed at the backside of the bottom frame.

2. The backlight unit according to claim 1, wherein the wire extends from the lamp.

3. The backlight unit according to claim 1, wherein the plug connector protrudes toward the backside of the bottom frame to face the socket connector.

4. The backlight unit according to claim 1, wherein the at least one lamp comprises a plurality of lamps arranged in a row.

5. The backlight unit according to claim 1, wherein the at least one lamp includes a ground part at an end portion thereof.

6. The backlight unit according to claim 1, further comprising a driving circuit that is operative to control the lamp, the driving circuit being disposed on the backlight driving circuit board.

7. The backlight unit according to claim 1, further comprising a reflective sheet on the bottom frame, the at least one lamp substantially disposed on the reflective sheet.

8. The backlight unit according to claim 1, further comprising an optical sheet on the at least one lamp.

9. The backlight unit according to claim 1, further comprising a plurality of side supports that fix the at least one lamp and are disposed on the bottom frame, the plurality of side supports disposed at both end portions of the at least one lamp.

10. The backlight unit according to claim 1, wherein the lamp comprises a fluorescent lamp.

11. A liquid crystal display module, comprising:
a backlight unit having a topside and a backside;
a bottom frame;
at least one lamp disposed on the topside of the bottom frame;
a socket connector disposed on a backside of the bottom frame, the socket connector being connected to the lamp, wherein the bottom frame has a hole that corresponds the socket connector, the socket connector being inserted into the hole of the bottom frame;
a backlight circuit board having a plug connector connected to the socket connector, wherein the plug connector connected to the socket connector is disposed in the hole of the bottom frame; and
a wire for connecting the socket connector to the lamp, wherein the wire is not exposed at the backside of the bottom frame.

12. The liquid crystal display module according to claim 11, wherein the lamp comprises a fluorescent lamp.

13. A method of connecting a backlight to a circuit board comprising:
providing a through hole through a bottom frame having a topside and a backside;
disposing at least one lamp on the topside of the bottom frame;
inserting a socket connector into the through hole;
connecting a wire between the at least one lamp and the socket connector, wherein the wire is not exposed at the backside of the bottom frame;
providing a plug connector on a backlight driving circuit board; and
inserting the socket connector into the plug connector, wherein the plug connector connected to the socket connector is disposed in the through hole of the bottom frame.

14. The method according to claim 13, further comprising: providing a reflective sheet on the topside of the bottom frame.

* * * * *